(12) United States Patent
Doi et al.

(10) Patent No.: US 11,149,406 B2
(45) Date of Patent: Oct. 19, 2021

(54) WORKING MACHINE

(71) Applicant: KOBELCO CONSTRUCTION MACHINERY CO., LTD., Hiroshima (JP)

(72) Inventors: Takayuki Doi, Hiroshima (JP); Ryuichi Hirose, Hiroshima (JP); Tomofumi Okada, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 290 days.

(21) Appl. No.: 15/962,087

(22) Filed: Apr. 25, 2018

(65) Prior Publication Data
US 2018/0347147 A1    Dec. 6, 2018

(30) Foreign Application Priority Data

May 30, 2017    (JP) .............................. JP2017-106250

(51) Int. Cl.
*E02F 9/12*    (2006.01)
*E02F 9/20*    (2006.01)
(Continued)

(52) U.S. Cl.
CPC ............. *E02F 9/123* (2013.01); *B60W 30/00* (2013.01); *E02F 9/2033* (2013.01); *E02F 9/24* (2013.01); *E02F 9/262* (2013.01)

(58) Field of Classification Search
CPC . E02F 9/123; E02F 9/2033; E02F 9/24; E02F 9/262; B60W 30/00
See application file for complete search history.

(56) References Cited

U.S. PATENT DOCUMENTS 5,957,989 A * 9/1999 Egawa .................. E02F 9/2033
                                                            701/50
9,776,566 B2 * 10/2017 Ishimoto .................. B60R 1/00
(Continued)

FOREIGN PATENT DOCUMENTS

CN    103141090 A    6/2013
EP    2 624 552 A1    8/2013
(Continued)

OTHER PUBLICATIONS

Extended European Search Report dated Oct. 15, 2018 in European Patent Application No. 18169175.9, citing documents AA, and AO through AR therein, 9 pages.

*Primary Examiner* — Jeff A Burke
*Assistant Examiner* — Joshua Alexander Garza
(74) *Attorney, Agent, or Firm* — Oblon, McClelland, Maier & Neustadt, L.L.P.

(57) ABSTRACT

To provide a working machine including a lower travelling body and an upper slewing body disposed in a slewable manner with respect to the lower travelling body, the working machine being capable of more reliably preventing the upper slewing body from coming into contact with an obstacle existing around the working machine. The working machine includes a detection device, a position identification device, and a movement control device. The position identification device includes a calculation section, a conversion section, and an identification section. The movement control device controls the movement of the upper slewing body in such a way as to prevent the upper slewing body from coming into contact with the obstacle based on the position of the obstacle relative to the virtual boundary surface, the position being identified by the identification section.

8 Claims, 14 Drawing Sheets

(51) Int. Cl.
*E02F 9/24* (2006.01)
*B60W 30/00* (2006.01)
*E02F 9/26* (2006.01)

(56) References Cited

U.S. PATENT DOCUMENTS

| | | | |
|---|---|---|---|
| 10,717,200 B2 * | 7/2020 | Machida | E02F 9/267 |
| 2013/0088593 A1 * | 4/2013 | Ishimoto | H04N 7/18 |
| | | | 348/143 |
| 2013/0182066 A1 | 7/2013 | Ishimoto | |
| 2013/0222573 A1 * | 8/2013 | Onuma | H04N 7/18 |
| | | | 348/82 |
| 2015/0142276 A1 * | 5/2015 | Wu | E02F 9/2033 |
| | | | 701/50 |
| 2016/0200252 A1 * | 7/2016 | Oota | G08G 1/166 |
| | | | 701/50 |
| 2017/0073935 A1 | 3/2017 | Friend et al. | |

FOREIGN PATENT DOCUMENTS

| | | |
|---|---|---|
| EP | 2 631 374 A1 | 8/2013 |
| EP | 2 716 821 A1 | 4/2014 |
| JP | 2007-23486 | 2/2007 |
| JP | 2013-253402 A | 12/2013 |

\* cited by examiner

WORKING MACHINE

BACKGROUND OF THE INVENTION

Field of the Invention

The present invention relates to a working machine in which an upper stewing body is disposed in a slewable manner with respect to a lower travelling body, specifically to a technique for controlling the operation of the working machine according to an obstacle existing around the working machine.

Background Art

In a working machine such as hydraulic excavator, an upper slewing body is disposed in a slewable manner with respect to a lower travelling body. Around such a working machine, there is a region difficult to be seen by an operator seated on a driver's seat. When an obstacle exists in the region, the operator cannot observe the obstacle directly.

Japanese Unexamined Patent Publication No. 2007-23486 discloses a technique for preventing a contact between an upper slewing body and an obstacle in such a situation. A contact avoidance control device disclosed in Japanese Unexamined Patent Publication No. 2007-23486 includes a millimeter-wave radar serving as a detection device for detecting an obstacle, and when detecting the presence of an obstacle within a collision avoidance area set around the upper slewing body during an operation of the upper sewing body such as slewing or backward movement, forcibly stops the operation. In the contact avoidance control device disclosed in Japanese Unexamined Patent Publication No. 2007-23486, the movement of the upper slewing body is controlled based only on the distance from the millimeter-wave radar serving as a detection device for detecting an obstacle to the obstacle.

SUMMARY OF THE INVENTION

In the contact avoidance control device disclosed in Japanese Unexamined Patent Publication No. 2007-23486, the upper stewing body performs a contact avoidance movement based only on the distance from the detection device to the obstacle. Therefore, it is difficult to perform an appropriate contact avoidance movement based on the actual positional relationship between the upper slewing body and the obstacle.

For example, even when the distance from the detection device to the obstacle is great, there is a possibility that a certain portion of the upper slewing body may approach the obstacle. In other words, even when the distance from the detection device to the obstacle is great, there is a possibility that the upper slewing body may come into contact with the obstacle. Accordingly, there is no choice but to perform the contact avoidance movement even when the distance from the detection device to the obstacle is great. As a result, there is a possibility that the contact avoidance movement may be performed more frequently than necessary, which would result in deterioration in working efficiency.

The present invention aims to provide a working machine including a lower travelling body and an upper slewing body disposed in a slewable manner with respect to the lower travelling body, the working machine being capable of more reliably preventing the upper stewing body from coming into contact with an obstacle existing around the working machine.

The inventors of the present invention have studied means to achieve the above-mentioned object, and come up with an idea to set a virtual boundary surface outside a side surface of the upper slewing body to identify the position of an obstacle relative to the boundary surface. The boundary surface is set according to the upper stewing body, and therefore, in order to recognize the positional relationship between the boundary surface and the obstacle, it only has to recognize the position of the obstacle with reference to the upper stewing body. The present invention has been made based on these findings.

A working machine according to the present invention comprises: a lower travelling body; an upper stewing body disposed in a slewable manner with respect to the lower travelling body; at least one detection device disposed on the upper stewing body to detect an obstacle existing around the upper stewing body; a position identification device configured to identify a position of the obstacle detected by the at least one detection device relatively to the upper stewing body; and a movement control device configured to control the movement of the upper stewing body in such a way as to prevent the upper stewing body from coming into contact with the obstacle, based on the position of the obstacle relative to the upper slewing body, the position being identified by the position identification device, wherein: the position identification device includes a calculation section configured to calculate a position of the obstacle relative to the at least one detection device, by use of a detection result obtained by the at least one detection device, a conversion section configured to convert the position of the obstacle relative to the at least one detection device calculated by the calculation section into a position of the obstacle relative to the upper stewing body, and an identification section configured to identify a position of the obstacle relative to a virtual boundary surface that is set outside a side surface of the upper stewing body in plan view, by use of a conversion result obtained by the conversion section; and the movement control device controls the movement of the upper stewing body in such a way as to prevent the upper stewing body from coming into contact with the obstacle based on the position of the obstacle relative to the virtual boundary surface, the position being identified by the identification section.

These and other objects, features and advantages of the present invention will become more apparent upon reading the following detailed description along with the accompanying drawings.

DETAILED DESCRIPTION OF THE PREFERRED EMBODIMENTS OF THE INVENTION

Hereinafter, an embodiment of the present invention will be described in detail with reference to the accompanying drawings.

Figure 1:
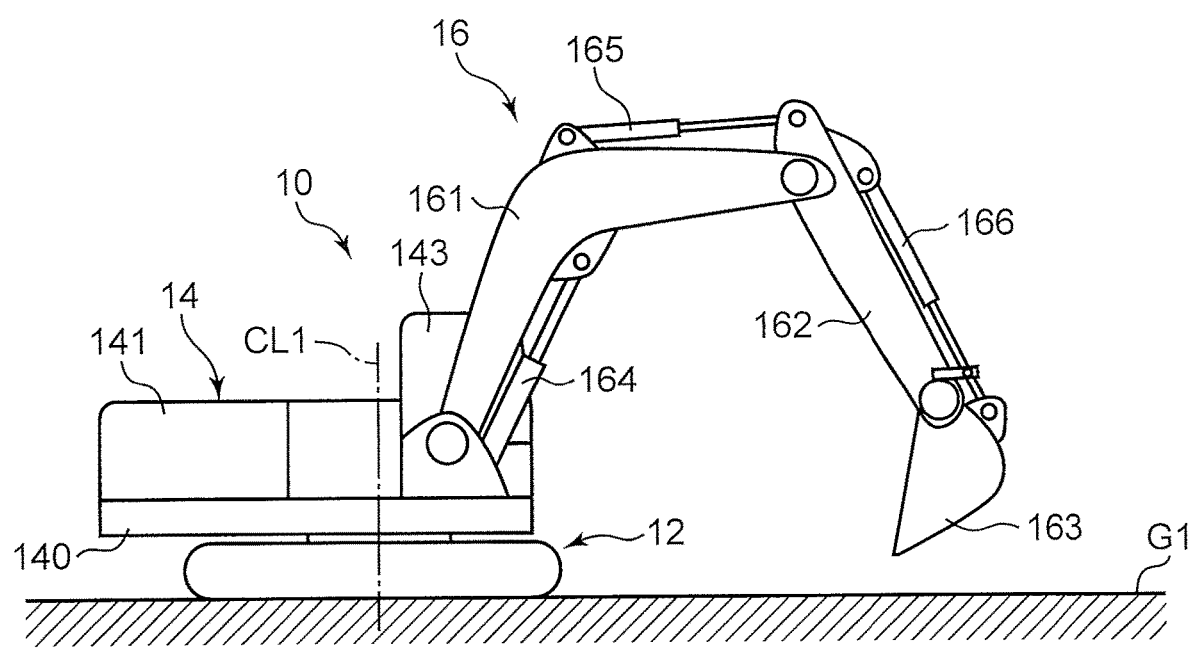
FIG. 1 is a right side view showing a schematic configuration of a hydraulic excavator illustrative of a working machine according to an embodiment of the present invention.

With reference to FIG. 1, a hydraulic excavator 10 illustrative of a working machine according to the embodiment of the present invention will be described. FIG. 1 is a right side view showing a schematic configuration of the hydraulic excavator 10.

The hydraulic excavator 10 includes a lower travelling body 12, an upper stewing body 14, and a working device 16, which will be described hereinafter.

Figure 2:
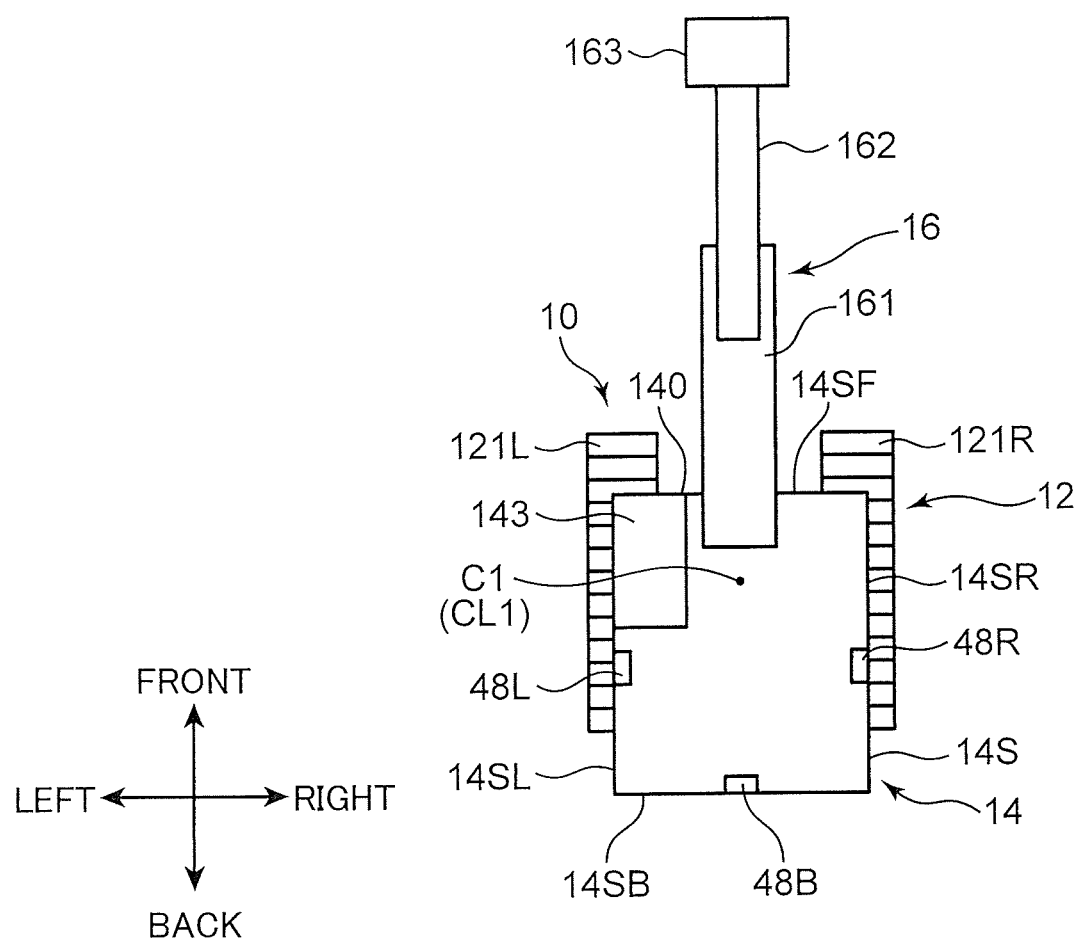
FIG. 2 is a plan view of the hydraulic excavator shown in FIG. 1.

The lower travelling body 12 includes a pair of left and right crawlers (see FIG. 2). The lower travelling body 12 moves along a ground G1 by movement of the pair of left and right crawlers 121L and 121R.

The upper stewing body 14 is located above the lower travelling body 12. The upper stewing body 14 is disposed in a slewable manner with respect to the lower travelling body 12. A central axis CL1 of slewing of the upper slewing body 14 extends in a vertical direction. The central axis CL1 coincides with a slewing center C1 (see FIG. 2) of the upper slewing body 14 in a plan view.

The upper slewing body 14 includes a stewing frame 140, an engine room 141, and a cab 143, which will be described hereinafter.

The stewing frame 140 is disposed in a slewable manner with respect to the lower travelling body 12. The slewing frame 140 supports the engine room 141, the cab 143, and the working device 16.

The engine room 141 is disposed on an upper surface of the stewing frame 140. The engine room 141 houses an engine as a driving source of the hydraulic excavator 10.

The cab 143 is disposed on the upper surface of the slewing frame 140. The cab 143 houses a driver's seat for an operator, and various operation devices to be used by the operator to operate the hydraulic excavator 10.

The working device 16 is disposed on the upper surface of the slewing frame 140. The working device 16 includes a boom 161, an arm 162, a bucket 163, a boom cylinder 164, an arm cylinder 165, and a bucket cylinder 166.

The boom 161 is disposed in such a way as to be pivotable with respect to the slewing frame 140 in a hoisting direction. The arm 162 is disposed pivotally with respect to a distal end of the boom 161. The bucket 163 is disposed pivotally with respect to a distal end of the arm 162.

The boom cylinder 164 actuates the boom 161 so that the boom 161 pivots with respect to the stewing frame 140 in the hoisting direction. The arm cylinder 165 actuates the arm 162 so that the arm 162 pivots with respect to the boom 161. The bucket cylinder 166 actuates the bucket 163 so that the bucket 163 pivots with respect to the arm 162.

Although not shown, the hydraulic excavator 10 includes a travelling device and a stewing device. The traveling device is used to cause the lower travelling body 12 to travel. The slewing device is used to cause the upper slewing body 14 to slew with respect to the lower travelling body 12.

With reference to FIG. 2, the upper stewing body 14 will be further described. FIG. 2 is a plan view of the hydraulic excavator 10.

The upper slewing body 14 includes a side surface 14S. The side surface 14S defines an outer edge of the upper slewing body 14 in the plan view. The side surface 14S includes a front surface 14Sf, a right surface 14SR, a left surface 14SL, and a rear surface 14SB.

Obstacle sensors 48R, 48L, and 48B illustrative of a plurality of (in the present embodiment, three) detection devices are disposed on the upper slewing body 14. Specifically, the obstacle sensor 48R is disposed on the right surface 14SR, the obstacle sensor 48L is disposed on the left surface 14SL, and the obstacle sensor 48B is disposed on the rear surface 14SB. The obstacle sensors 48R, 48L, and 48B will be described in detail later.

Figure 3:
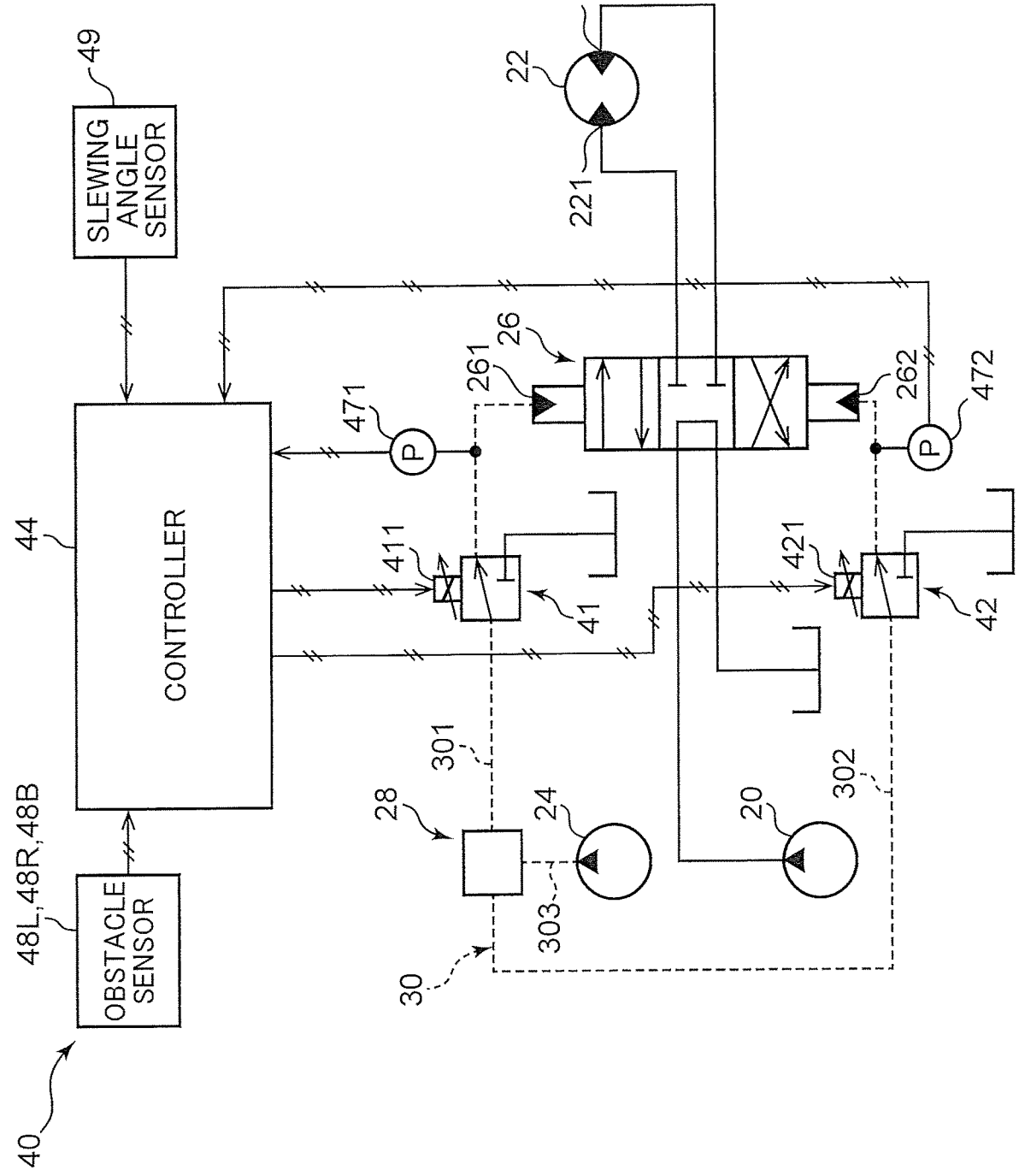
FIG. 3 is a diagram showing a hydraulic circuit included in the hydraulic excavator shown in FIG. 1.

With reference to FIG. 3, a hydraulic circuit 18A included in the hydraulic excavator 10 will be described. FIG. 3 is a diagram showing the hydraulic circuit 18A.

The hydraulic circuit 18A is used for the travelling device included in the hydraulic excavator 10. The hydraulic excavator 10 includes a hydraulic circuit 18B in addition to the hydraulic circuit 18A. The hydraulic circuit 18B is used for the slewing device included in the hydraulic excavator 10. The hydraulic circuit 18B has a similar structure to that of the hydraulic circuit 18A. Accordingly, hereinafter, only the hydraulic circuit 18A will be described and a detailed description of the hydraulic circuit 18B will be omitted.

The hydraulic circuit 18A includes a hydraulic pump 20, a hydraulic motor 22, a pilot pump 24, a control valve 26, and an operation device 28.

The hydraulic pump 20 is driven by the engine included in the hydraulic excavator 10. The hydraulic pump 20 supplies hydraulic fluid to the hydraulic motor 22.

The hydraulic motor 22 is driven by the supply of the hydraulic fluid. In the hydraulic circuit 18A constituting the traveling device, the hydraulic motor 22 serves as a travelling motor for driving the crawler 121L (121R). In the hydraulic circuit 18B constituting the slewing device, the hydraulic motor 22 serves as a stewing motor for causing the upper stewing body 14 to slew.

The hydraulic motor 22 includes a first port 221 and a second port 222. The hydraulic motor 22 includes an output shaft, and when the hydraulic fluid is supplied to the first port 221, the output shaft rotates in a first rotational direction at a speed corresponding to the flow rate of the supplied hydraulic fluid with the hydraulic fluid being discharged through the second port 222. On the other hand, the hydraulic motor 22 is configured such that when the hydraulic fluid is supplied to the second port 222, the output shaft rotates in a second rotational direction opposite to the first rotational direction at a speed corresponding to the flow rate of the supplied hydraulic fluid with the hydraulic fluid being discharged through the first port 221.

Specifically, in the hydraulic circuit 18A constituting the travelling device, the rotation of the output shaft of the hydraulic motor 22 in the first rotational direction causes the crawler 121L (121R) to move in an advancing direction, and the rotation of the output shaft of the hydraulic motor 22 in the second rotational direction causes the crawler 121L (121R) to move in a rearward movement direction. In the hydraulic circuit 18B constituting the slewing device, the rotation of the output shaft of the hydraulic motor 22 in the first rotational direction causes the upper slewing body 14 to slew rightward, and the rotation of the output shaft of the hydraulic motor 22 in the second rotational direction causes the upper slewing body 14 to slew leftward.

The control valve 26 is located between the hydraulic pump 20 and the hydraulic motor 22. The control valve 26 changes the direction and the flow rate of the hydraulic fluid being supplied from the hydraulic pump 20 to the hydraulic motor 22. In the example shown in FIG. 3, the control valve 26 is in the form of a three-way pilot operated directional control valve including a first pilot port 261 and a second pilot port 262.

When neither the first pilot port 261 nor the second pilot port 62 is supplied with pilot pressure, the control valve 26 is at a neutral position (the middle position shown in FIG. 3). Consequently, the supply of the hydraulic fluid from the hydraulic pump 20 to the hydraulic motor 22 is blocked to keep the hydraulic motor 22 from rotating.

When the first pilot port 261 is supplied with the pilot pressure, the control valve 26 is switched from the neutral position (the middle position shown in FIG. 3) to a first operative position (the upper position shown in FIG. 3) to permit the supply of the hydraulic fluid from the hydraulic pump 20 to the first port 221 of the hydraulic motor 22 at a flow rate corresponding to its stroke, while permitting return of the hydraulic fluid from the second port 222 to a tank.

When the second pilot port 262 is supplied with the pilot pressure, the control valve 26 is switched from the neutral position (the middle position shown in FIG. 3) to a second operative position (the lower position shown in FIG. 3) to permit the supply of the hydraulic fluid from the hydraulic pump 20 to the second port 222 of the hydraulic motor 22 at a flow rate corresponding to its stroke, while permitting return of the hydraulic fluid from the first port 221 to the tank.

The pilot pump 24 is in the form of a hydraulic pump. The pilot pump 24 is driven by the engine included in the hydraulic excavator 10 to discharge pilot oil. The discharged pilot oil is supplied to the first pilot port 261 and the second pilot port 262 by means of a pilot line 30. In other words, the pilot pump 24 functions as a pilot hydraulic source of the control valve 26.

The operation device 28 is disposed in the pilot line 30. The operation device 28 receives an operation command from the operator and functions as a pressure reducing valve. Specifically, the operation device 28 permits supply of the pilot oil from the pilot pump 24 to one of the first pilot port 261 and the second pilot port 262 that corresponds to an operation command inputted therein, while increasing the pressure of the pilot oil at a rate corresponding to a magnitude specified by the operation command. In this manner, the pilot pressure to be supplied to the pilot port corresponding to the operation command is adjusted.

In the hydraulic circuit 18A constituting the travelling device, the operation device 28 may be in the form of a pedal or a lever, for example. In the hydraulic circuit 18B constituting the slewing device, the operation device 28 is in the form of a lever, for example.

The pilot line 30 includes a first pilot line 301, a second pilot line 302, and a third pilot line 303. The first pilot line 301 connects the operation device 28 with the first pilot port 261. The second pilot line 302 connects the operation device 28 with the second pilot port 262. The third pilot line 303 connects the pilot pump 24 with the operation device 28.

The hydraulic excavator 10 further includes a safety device 40. The safety device 40 causes the hydraulic excavator 10 to perform a motion to prevent the upper slewing body 14 from coming into contact with an obstacle.

The safety device 40 includes a first limiting valve 41, a second limiting valve 42, a plurality of sensors, and a controller 44, which will be described hereinafter.

The first limiting valve 41 is disposed in the first pilot line 301. The first limiting valve 41 is located between the operation device 28 and the first pilot port 261 of the control valve 26.

The first limiting valve 41 is in the form of an electromagnetic inverse proportional valve including a variable solenoid 411. When no command is input to the variable solenoid 411, the first limiting valve 41 is fully opened. In other words, the pilot pressure as specified by the operation command is supplied to the control valve 26.

On the other hand, when a stop command (specifically, a maximum exciting current) is input to the variable solenoid 411, the first limiting valve 41 is fully closed. Consequently, the supply of the pilot pressure to the control valve 26 (first pilot port 261) is blocked to return the control valve 26 to the neutral position, regardless of the operation command. In this manner, the hydraulic motor 22 is forcibly stopped.

Further, when a restricting command (specifically, an exciting current smaller than the maximum exciting current) is input to the variable solenoid 411, the first limiting valve 41 is closed by degrees corresponding to the restricting command. Consequently, the pilot pressure is reduced to a value lower than the pilot pressure specified by the operation command, to thereby make the rotational speed of the hydraulic motor 22 in the first rotational direction smaller than a speed specified by the operation command.

The second limiting valve 42 is disposed in the second pilot line 302. The second limiting valve 42 is located between the operation device 28 and the second pilot port 262 of the control valve 26.

The second limiting valve 42 is, similarly to the first limiting valve 41, in the form of an electromagnetic inverse proportional valve including a variable solenoid 421. Because the second limiting valve 42 operates in a similar manner to the first limiting valve 41, a detailed description about the operation of the second limiting valve 42 is omitted.

The plurality of sensors included in the safety device 40 includes pilot pressure sensors 471 and 472, obstacle sensors 48R, 48L and 48B, and a slewing angle sensor 49.

The pilot pressure sensor 471 generates a signal relating to the magnitude of a pilot pressure to be input to the pilot port 261 as information relating to the operation command given to the operation device 28. The pilot pressure sensor 472 operates in a similar manner to the pilot pressure sensor 471.

The obstacle sensor 48R detects an obstacle existing to the right of the upper slewing body 14, and identifies the position of the detected obstacle with respect to the upper slewing body 14. The obstacle sensor 48L detects an obstacle existing to the left of the upper slewing body 14, and identifies the position of the detected obstacle with respect to the upper slewing body 14. The obstacle sensor 48B detects an obstacle existing behind the upper slewing body 14, and identifies the position of the detected obstacle with respect to the upper slewing body 14.

The slewing angle sensor 49 generates a signal relating to a slewing angle of the upper slewing body 14 with respect to the lower travelling body 12.

The controller 44 is realized, for example, by a central processing unit reading a program stored in a storage device and performing predetermined processing. At least part of the controller 44 may be realized by an integrated circuit such as ASIC.

The controller 44 receives signals generated by the obstacle sensors 48R, 48L and 48B and the slewing angle sensor 49, and performs a safety control of the operation of the hydraulic motor 22 based on the received signals.

Figure 4:
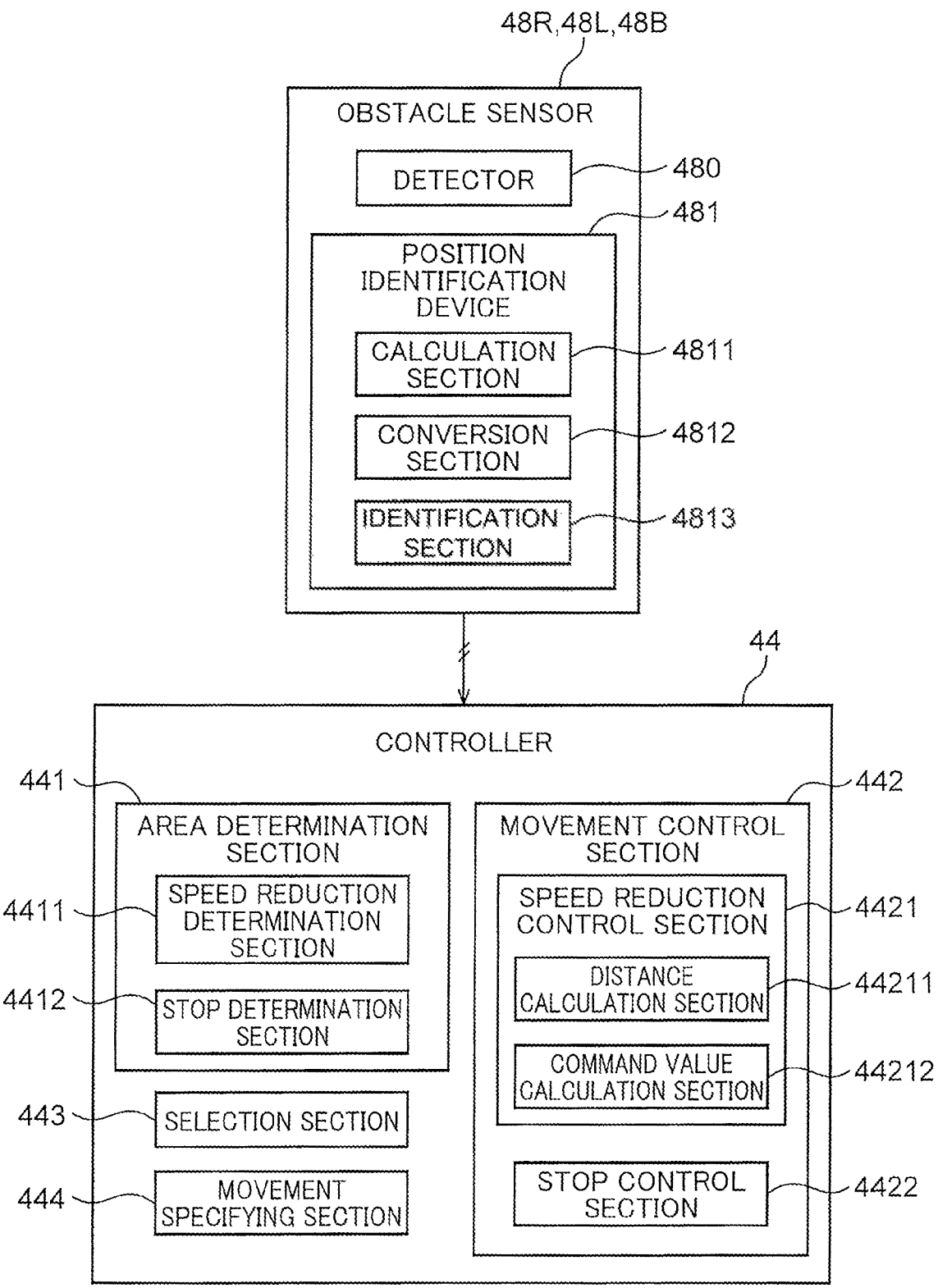
FIG. 4 is a block diagram showing an obstacle sensor and a controller.

With reference to FIG. 4, the obstacle sensors 48R, 48L and 48B, and the controller 44 will be described. FIG. 4 is a block diagram showing the obstacle sensor 48R (48L, 48B) and the controller 44.

In the present embodiment, the plurality of obstacle sensors 48R, 48L and 48B are of the same configuration. Accordingly, hereinafter, only the obstacle sensor 48R will be described and descriptions of the obstacle sensors 48L and 48B will be omitted.

The obstacle sensor 48R is, for example, in the form of a laser sensor. The laser sensor is not particularly limited as long as it can scan a laser beam to obtain a distance to a position at which the laser beam is reflected (distance to an obstacle reflecting the laser beam) and a direction in which the obstacle reflecting the laser beam lies.

The obstacle sensor 48R includes a detector 480 and a position identification device 481. The detector 480 detects an obstacle. The position identification device 481 identifies the position of the obstacle detected by the detector 480 with respect to the upper stewing body 14.

The position identification device 481 includes a calculation section 4811, a conversion section 4812, and a identification section 4813, which will be described hereinafter.

The calculation section 4811 uses a detection result obtained by the obstacle sensor 48R to calculate the position of an obstacle with respect to the obstacle sensor 48R. The detection result obtained by the obstacle sensor 48R includes a direction in which the obstacle lies and a distance to the obstacle, for example. The position of the obstacle with respect to the obstacle sensor 48R refers, for example, to the position of the obstacle in a two-dimensional coordinate system in which the position where the obstacle sensor 48R is located in the plan view is taken as the origin. The method of calculating the position of the obstacle with respect to the obstacle sensor 48R is, for example, a calculation using the distance to the obstacle and the direction in which the obstacle lies that are obtained by the scanning of the laser beam as mentioned above. The direction in which the obstacle lies is identified, for example, by an angle formed by a straight line connecting the obstacle sensor 48R and the obstacle and a predetermined reference line (for example, a straight line extending in a direction serving as a reference when emitting the laser beam).

The conversion section 4812 converts the position of the obstacle with respect to the obstacle sensor 48R calculated by the calculation section 4811 into a position of the obstacle with respect to the upper slewing body 14. The position of the obstacle with respect to the upper slewing body 14 refers, for example, to the position of the obstacle in a two-dimensional coordinate system in which the slewing center C1 of the upper stewing body 14 in the plan view is taken as the origin. The method of converting the position of the obstacle with respect to the obstacle sensor 48R into the position of the obstacle with respect to the upper slewing body 14 is, for example, as follows.

First, the origin for identifying the obstacle position is corrected. Specifically, the origin is changed from the position of the obstacle sensor 48R to the position of the slewing center C1 of the upper slewing body 14. Such a correction of the origin is performed by referring to the position of the obstacle sensor 48R with respect to the slewing center CL.

Thereafter, the position of the obstacle is corrected according to the rotational angle of the coordinate axes centered on the slewing center CL. For example, when the x-axis and the y-axis of the coordinate system with the stewing center C1 as the origin are oblique to the x-axis and the y-axis of the coordinate system with the position of the obstacle sensor 48R as the origin, the x-coordinate and the y-coordinate of the obstacle are corrected so that the obstacle is located in the coordinate system with the slewing center C1 as the origin. Such a correction is performed using, for example, a trigonometric function.

In this manner, it is possible to convert the position of the obstacle with respect to the obstacle sensor 48R into the position of the obstacle with respect to the upper slewing body 14.

Figure 5:
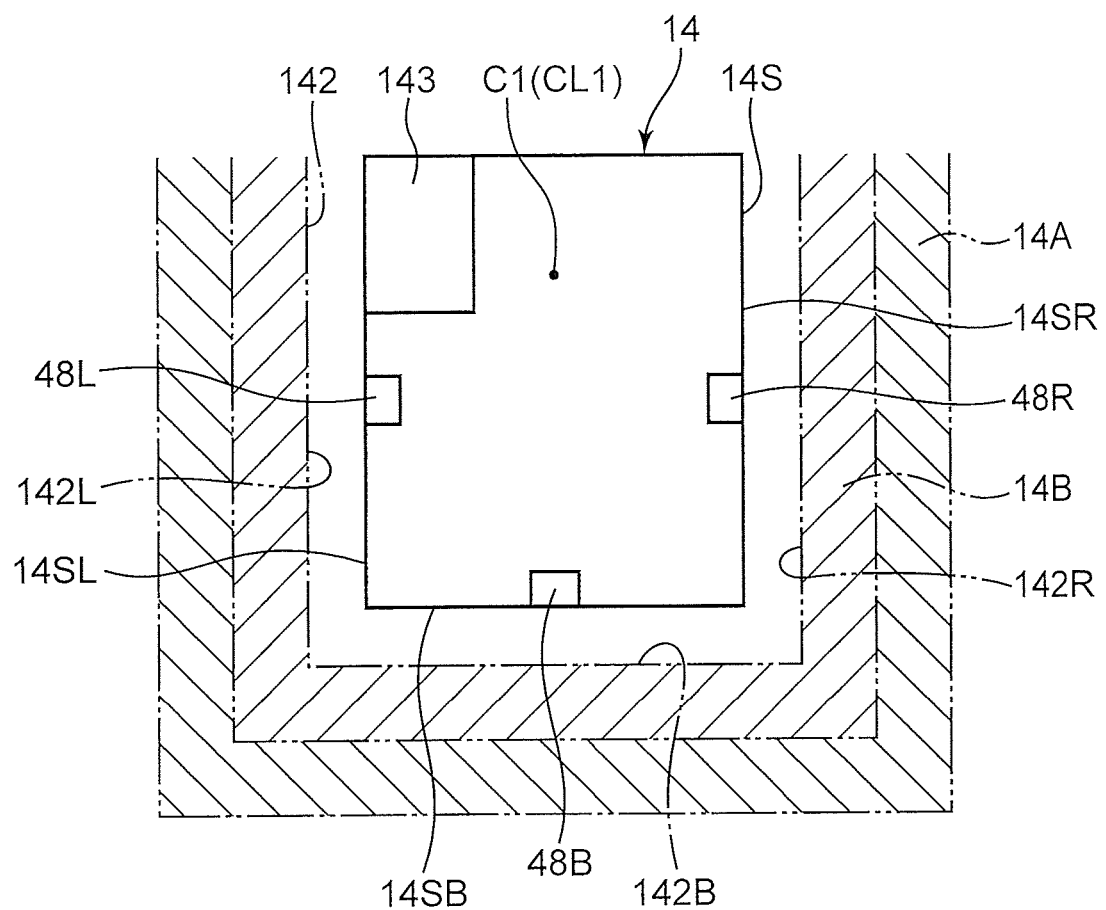
FIG. 5 is an explanatory diagram showing a virtual boundary surface.

The identification section 4813 uses a conversion result obtained by the conversion section 4812 to identify the position of the obstacle with respect to a virtual boundary surface 142 (see FIG. 5). Information for identifying the position of the obstacle with respect to the virtual boundary surface 142 includes, for example, a portion of the virtual boundary surface 142 that is closest to the obstacle and the shortest distance from the part to the obstacle.

The virtual boundary surface 142 will be described with reference to FIG. 5. The virtual boundary surface 142 is set outside the side surface 14S of the upper slewing body 14 in the plan view. The virtual boundary surface 142 is set along the side surface 14S. The virtual boundary surface 142 includes a right virtual boundary surface 142R, a left virtual boundary surface 142L, and a rear virtual boundary surface 142B.

The right virtual boundary surface 142R is located to the right of the right surface 14SR. The right virtual boundary surface 142R is set in parallel to the right surface 14SR. A front end of the right virtual boundary surface 142R lies at substantially the same position as a front end of the right surface 14SR in a front-rear direction of the upper slewing body 14. A rear end of the right virtual boundary surface 142R lies behind a rear end of the right surface 14SR in the front-rear direction of the upper slewing body 14. The distance from the right surface 14SR to the right virtual boundary surface 142R is, for example, 500 mm.

The left virtual boundary surface 142L is located to the left of the left surface 14SL. The left virtual boundary surface 142L is set in parallel to the left surface 14SL. A front end of the left virtual boundary surface 142L lies at substantially the same position as a front end of the left surface 14SL in the front-rear direction of the upper slewing body 14. A rear end of the left virtual boundary surface 142L lies behind a rear end of the left surface 14SL in the front-rear direction of the upper slewing body 14. The distance from the left surface 14SL to the left virtual boundary surface 142L is the same as the distance from the right surface 14SR to the right virtual boundary surface 142R.

The rear virtual boundary surface 142B is located behind the rear surface 14SB. The rear virtual boundary surface 142B is set in parallel to the rear surface 14SB. The rear virtual boundary surface 142B connects the rear end of the right virtual boundary surface 142R and the rear end of the left virtual boundary surface 142L. The distance from the rear surface 14SB to the rear virtual boundary surface 142B is the same as the distance from the right surface 14SR to the right virtual boundary surface 142R.

Description will be made with reference to FIG. 4 again. The controller 44 causes the hydraulic excavator 10 to perform such a movement as to prevent the upper slewing body 14 from coming into contact with an obstacle. The controller 44 includes an area determination section 441, a movement control section 442, a selection section 443, and a movement specifying section 444.

The area determination section 441 determines whether an obstacle exists within a predetermined area. The area determination section 441 includes a speed reduction determination section 4411 and a stop determination section 4412.

The speed reduction determination section 4411 determines whether an obstacle exists within a speed reduction area 14A. The stop determination section 4412 determines whether an obstacle exists within a stop area 14B.

With reference to FIG. 5, the speed reduction area 14A and the stop area 14B will be described.

The speed reduction area 14A is set outside the virtual boundary surface 142 in the plan view. The speed reduction area 14A has an approximately constant width, and extends along the virtual boundary surface 142. In other words, the distance from the outer edge to the inner edge of the speed reduction area 14A is approximately constant over the entire length in an extending direction of the speed reduction area 14A. The distance from the outer edge to the inner edge of the speed reduction area 14A is, for example, 1000 mm.

The stop area 14B is set outside the virtual boundary surface 142 in the plan view. The stop area 14B is located inside the speed reduction area 14A. The stop area 14B has an approximately constant width, and extends along the virtual boundary surface 142. In other words, the distance from the outer edge to the inner edge of the stop area 14B is approximately constant over the entire length in an extending direction of the stop area 14B. Here, the outer edge of the stop area 14B coincides with the inner edge of the speed reduction area 14A. The inner edge of the stop area 14B coincides with the virtual boundary surface 142. The distance from the outer edge to the inner edge of the stop area 14B is, for example, 500 mm.

Description will be made with reference to FIG. 4 again. The movement control section 442 controls the movement of at least one of the upper slewing body 14 and the lower travelling body 12, thereby causing the hydraulic excavator 10 to perform such a movement as to prevent the upper slewing body 14 from coming into contact with an obstacle. The movement control section 442 includes a speed reduction control section 4421 and a stop control section 4422.

The speed reduction control section 4421 reduces the movement speed of the upper stewing body 14 when at least a part of an obstacle lies within the speed reduction area 14A. The stop control section 4422 stops the movement of the upper slewing body 14 when at least a part of an obstacle lies within the stop area 14B.

The speed reduction control section 4421 includes a distance calculation section 44211 and a command value calculation section 44212, which will be described hereinafter.

The distance calculation section 44211 calculates the shortest distance from an obstacle to the virtual boundary surface 142.

The command value calculation section 44212 calculates a current command value (current command value for driving the first limiting valve 41 and the second limiting valve 42) corresponding to the distance calculated by the distance calculation section 44211. In the present embodiment, the current command value increases as the distance calculated by the distance calculation section 44211 decreases. The calculation of the current command value is performed using a table stored in the storage device included in the controller 44.

The selection section 443 selects an obstacle closest to the virtual boundary surface 142. When a plurality of obstacles exist, an obstacle whose shortest distance from the virtual boundary surface 142 is shortest among the plurality of obstacles is selected as an obstacle closest to the virtual boundary surface. When only a single obstacle exists, the single obstacle is selected as the obstacle closest to the virtual boundary surface 142.

The movement specifying section 444 specifies a movement of the upper slewing body 14 of approaching an obstacle, among movements of the upper slewing body 14. The movement of the upper slewing body 14 of approaching an obstacle is specified considering the position of the obstacle with respect to the upper slewing body 14, the slewing state (such as the stewing angle and the slewing direction) of the upper slewing body 14 with respect to the lower travelling body 12, and the travelling state (such as the travelling direction) of the lower travelling body 12, for example.

Figure 6:
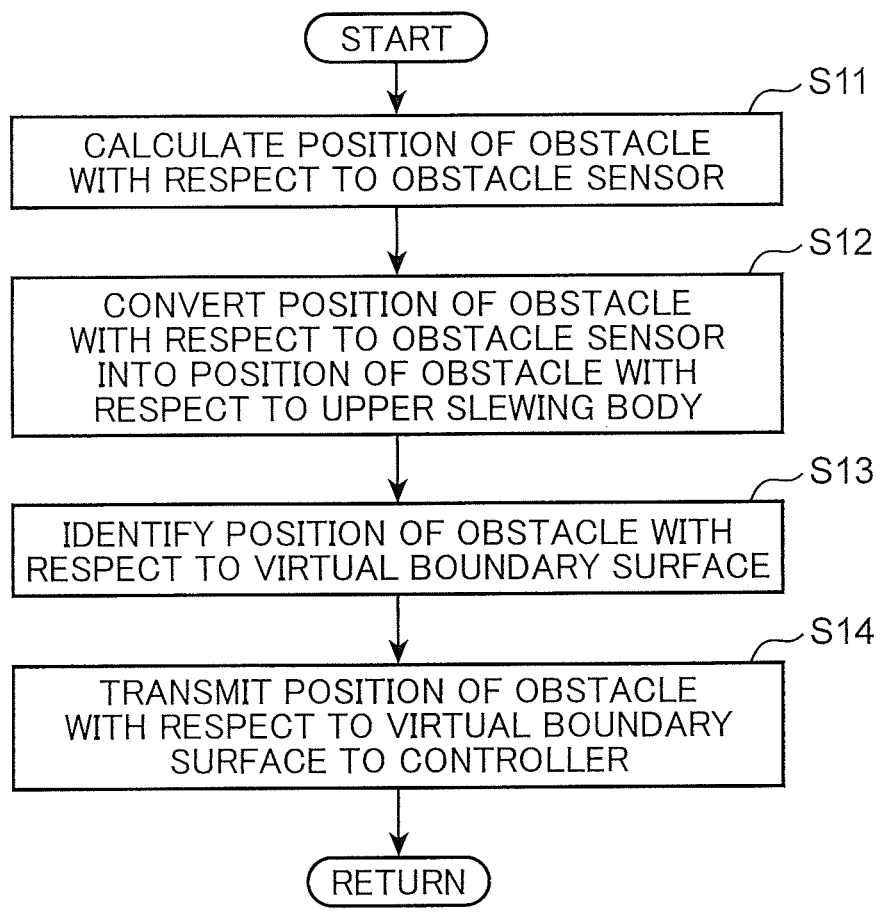
FIG. 6 is a flowchart showing a position identification control performed by a position identification device.

With reference to FIG. 6, a position identification control performed by the position identification device 481 will be described. FIG. 6 is a flowchart showing the position identification control performed by the position identification device 481.

Hereinafter, a case where the position identification device 481 uses a detection result obtained by the obstacle sensor 48R will be described. Cases of using a detection result obtained by the obstacle sensor 48L or 48B are similar to the case of using the detection result obtained by the obstacle sensor 48R, and therefore, descriptions thereof will be omitted.

At step S11, the position identification device 481 uses a detection result obtained by the obstacle sensor 48R to calculate the position of a detected obstacle relative to the obstacle sensor 48R. Thereafter, at step S12, the position identification device 481 converts the position of the obstacle with respect to the obstacle sensor 48R calculated by the calculation section 4811 into a position of the obstacle relative to the upper slewing body 14. Thereafter, at step S13, the position identification device 481 uses a conversion result obtained by the conversion section 4812 to identify the position of the obstacle relative to the virtual boundary surface 142. Thereafter, at step 514, the position identification device 481 transmits to the controller 44 the position of the obstacle relative to the virtual boundary surface 142 identified at step S13.

Figure 7:
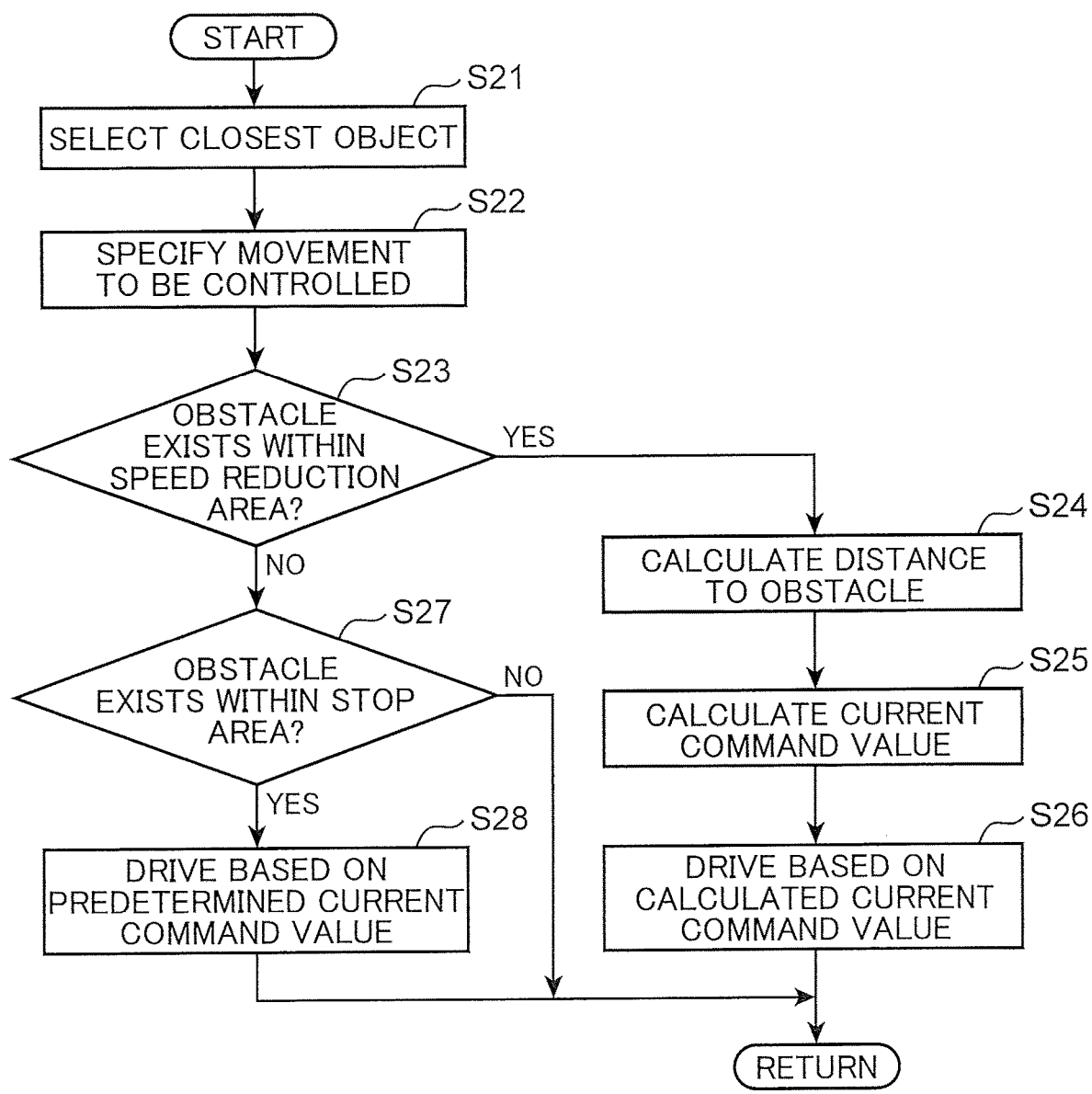
FIG. 7 is a flowchart showing a safety control performed by the controller.

With reference to FIG. 7, the safety control performed by the controller 44 will be described. FIG. 7 is a flowchart showing the safety control performed by the controller 44.

At step S21, the controller 44 selects an obstacle closest to the virtual boundary surface 142 based on the positions of obstacles relative to the virtual boundary surface 142 transmitted from the position identification device 481.

Thereafter, at step S22, the controller 44 specifies a movement of the upper slewing body 14 to be controlled, based on the position of the obstacle selected at step S21 relative to the virtual boundary surface 142, the slewing state of the upper slewing body 14 with respect to the lower travelling body 12, and the travelling state of the lower travelling body 12.

Thereafter, at step S23, the controller 44 determines whether at least part of the obstacle selected at step S21 lies within the speed reduction area 14A.

When at least a part of the obstacle lies within the speed reduction area 14A (step S23: YES), the controller 44 calculates, at step S24, the shortest distance from the obstacle selected at step S21 to the virtual boundary surface 142. Thereafter, at step S25, the controller 44 calculates the current command value corresponding to the distance calculated at step S24. Thereafter, at step S26, the controller 44 controls the operations of the first limiting valve 41 and the second limiting valve 42 based on the current command value calculated at step S25. Consequently, the movement speed of the upper slewing body 14 is reduced. Thereafter, the controller 44 terminates the safety control.

When at least a part of the obstacle does not lie within the speed reduction area 14A (step S23: NO), the controller 44 determines, at step S27, whether at least a part of the obstacle lies within the stop area 14B.

When at least a part of the obstacle does not lie within the stop area 14B (step S27: NO), the controller 44 terminates the safety control. On the other hand, when at least a part of the obstacle lies within the stop area 14B (step S27: YES), the controller 44 controls the respective operations of the first limiting valve 41 and the second limiting valve 42 based on a predetermined current command value at step S28. Consequently, the movement of the upper slewing body 14 is stopped. Thereafter, the controller 44 terminates the safety control.

Figure 8A:
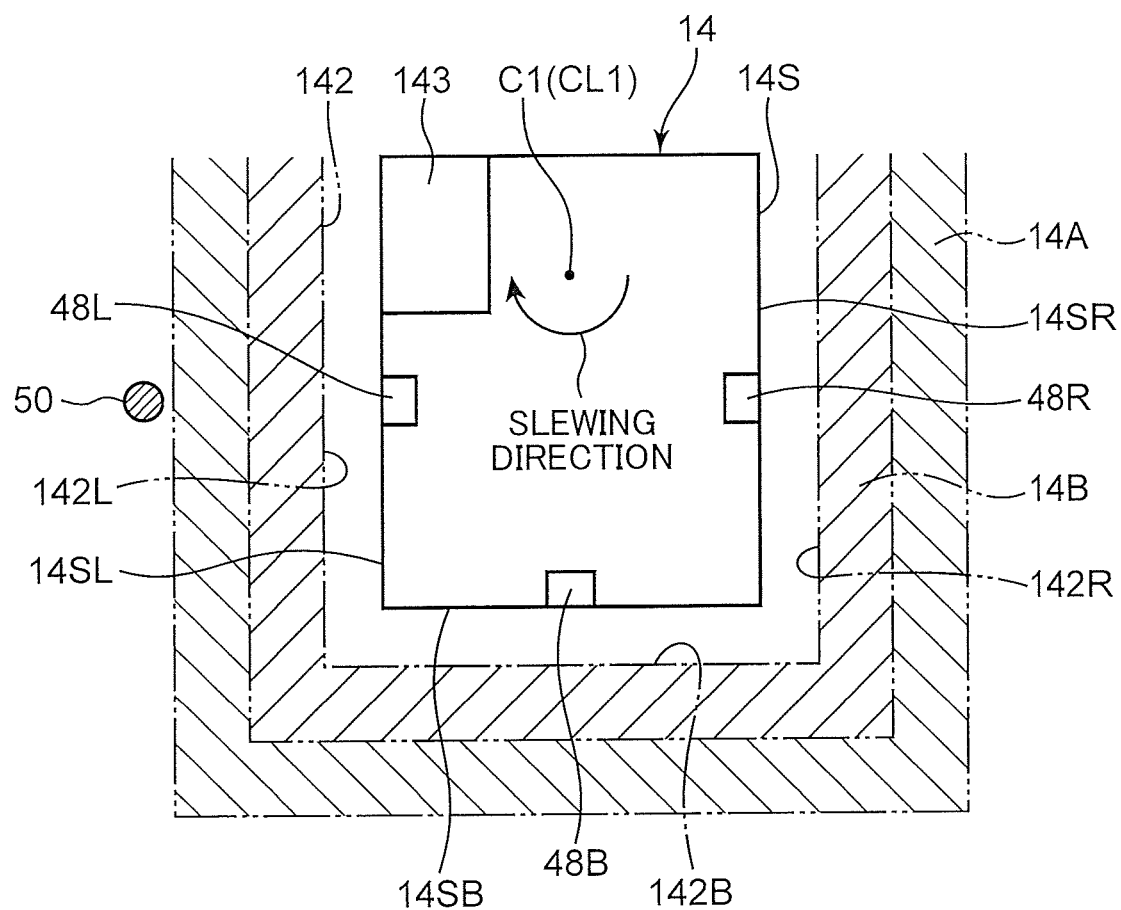
FIG. 8A is an explanatory diagram showing a state in which an upper slewing body is stewed rightward (clockwise) and an obstacle exists outside a speed reduction area.
Figure 8B:
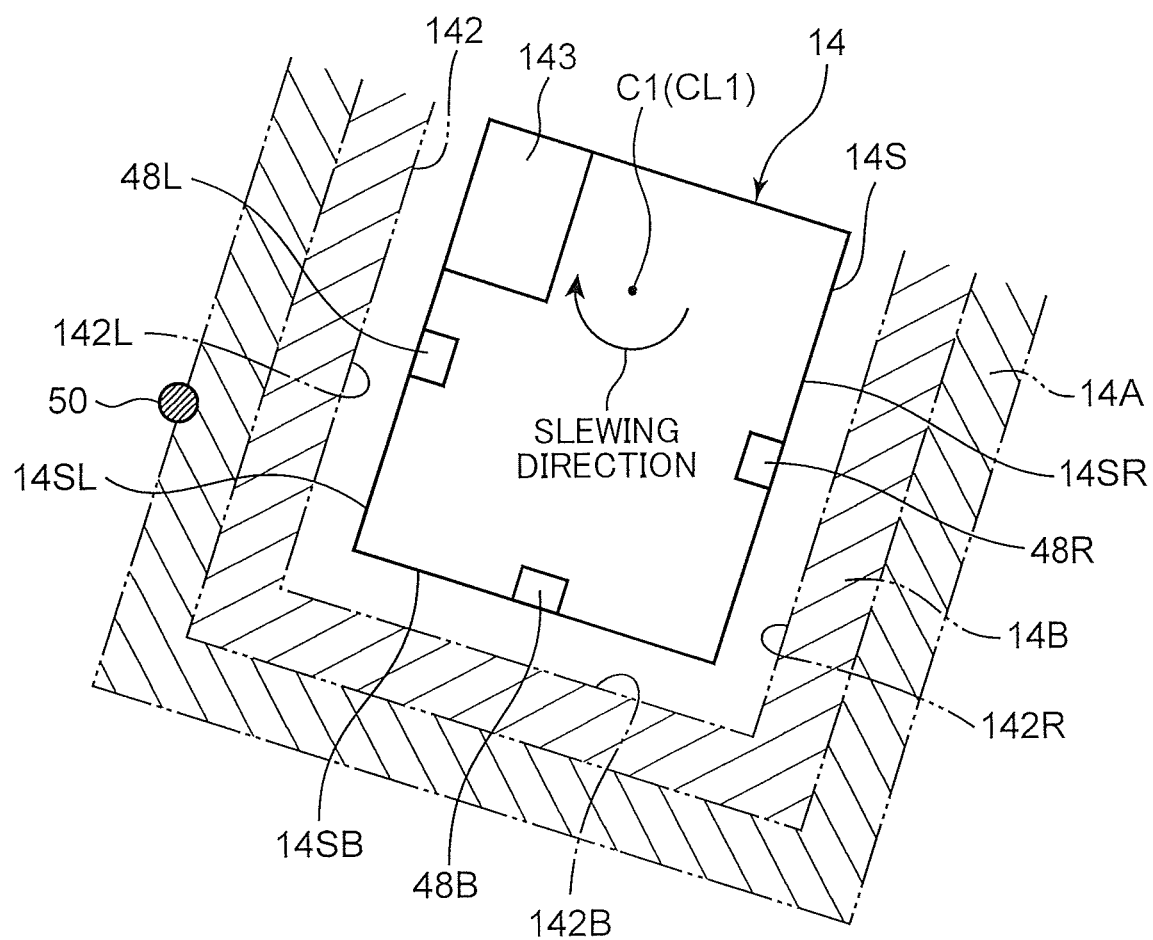
FIG. 8B is an explanatory diagram showing a state in which the upper slewing body is turned further from the position shown in FIG. 8A and a part of the obstacle lies within the speed reduction area.

In the hydraulic excavator 10 configured in this manner, it is possible to recognize the position of the obstacle in the two-dimensional coordinate system with the slewing center C1 of the upper slewing body 14 as the origin. Consequently, it is possible to accurately recognize the position of the obstacle relative to the virtual boundary surface 142, which will be described in detail below, FIG. 8A is an explanatory diagram showing a state in which the upper slewing body 14 is slewed rightward (clockwise) and an obstacle 50 exists outside the speed reduction area 14A. FIG. 8B is an explanatory diagram showing a state in which the upper slewing body 14 is turned further from the position shown in FIG. 8A and a part of the obstacle 50 lies within the speed reduction area 14A.

When the upper slewing body 14 moves from the position shown in FIG. 8A to the position shown in FIG. 8B, the distance from the obstacle sensor 48L to the obstacle 50 increases, whereas the distance from the obstacle 50 to the left virtual boundary surface 142L decreases. In other words, the upper slewing body 14 seems to move in a direction away from the obstacle 50 based on a detection result obtained by the obstacle sensor 48L, but recognition of the position of the obstacle 50 in the two-dimensional coordinate system with the slewing center C1 of the upper slewing body 14 as the origin makes it possible to know that the upper slewing body 14 moves in a direction approaching the obstacle 50. Therefore, as described above, it is possible to accurately recognize the position of the obstacle relative to the virtual boundary surface 142 by recognizing the position of the obstacle in the two-dimensional coordinate system with the slewing center C1 of the upper slewing body 14 as the origin.

Here, the virtual boundary surface 142 is set outside the side surface 14S of the upper slewing body 14 in the plan view. Therefore, when the position of the obstacle 50 is recognized in relation to the virtual boundary surface 142, it is possible to more reliably prevent the upper slewing body 14 from coming into contact with the obstacle 50.

Further, in the hydraulic excavator 10, when a movement of the upper slewing body 14 to be controlled is specified, not only the position of the obstacle 50 relative to the virtual boundary surface 142, but also the slewing state of the upper slewing body 14 with respect to the lower travelling body 12 and the travelling state of the lower travelling body 12 are considered. This makes it possible to appropriately select a movement of the upper slewing body 14 to avoid a contact with an obstacle, which will be described further in detail below.

Figure 9A:
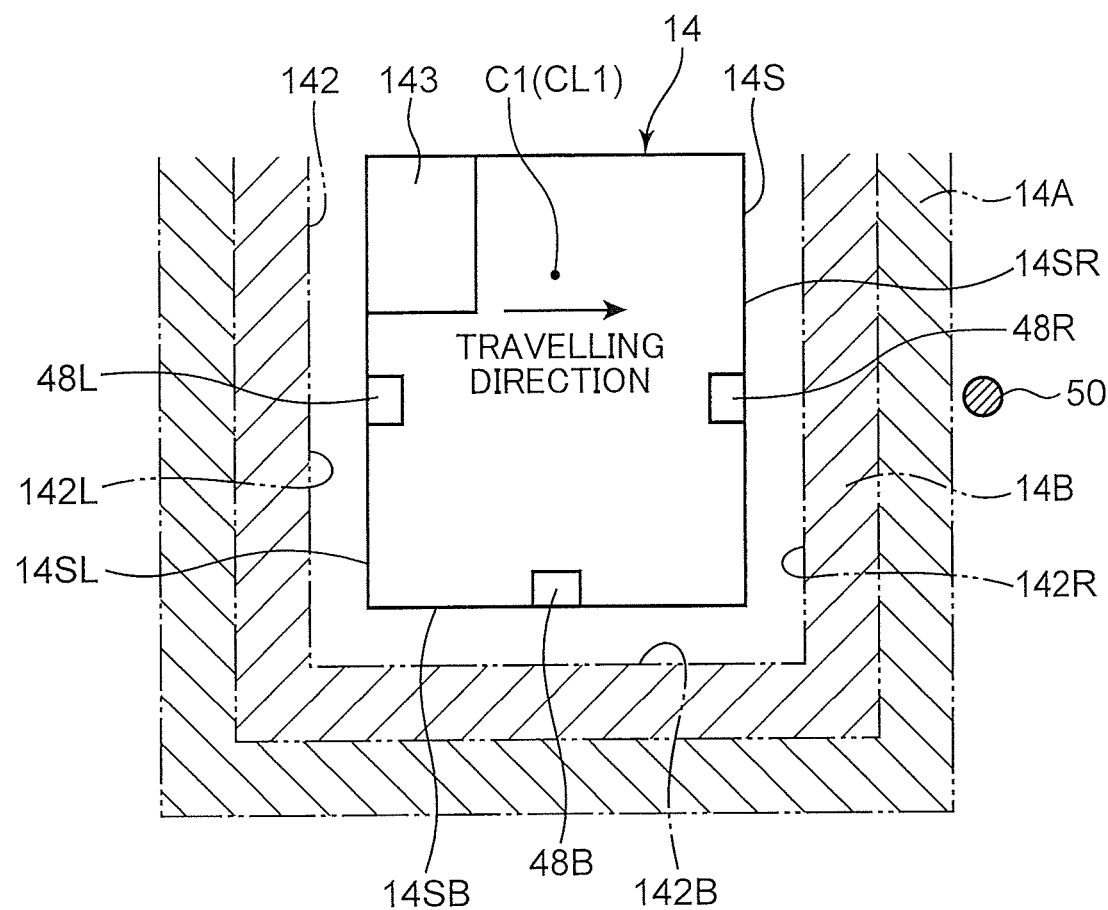
FIG. 9A is an explanatory diagram showing a state in which an obstacle exists outside the speed reduction area when a lower travelling body advances with the upper stewing body stewed leftward (counterclockwise) through 90 degrees from a reference position (position at which a front-rear direction of the upper sewing body coincides with a front-rear direction of the lower travelling body).
Figure 9B:
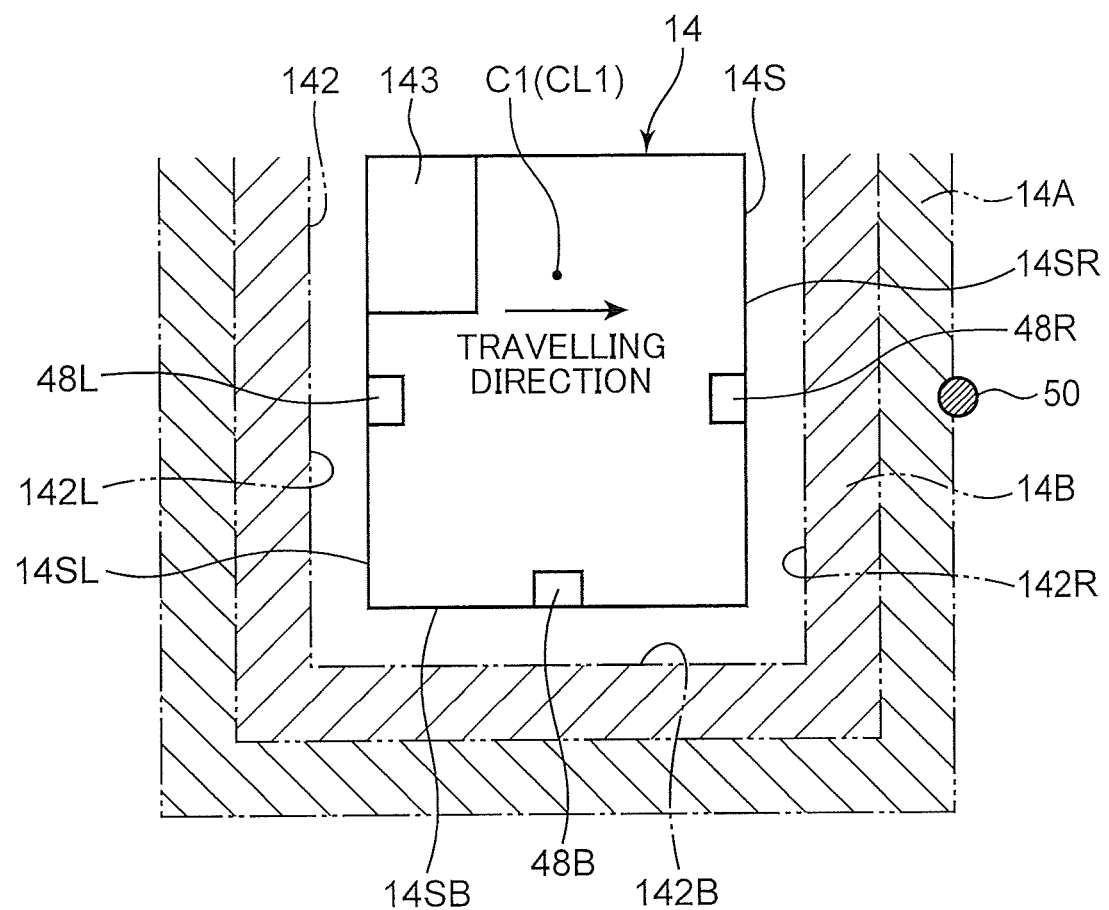
FIG. 9B is an explanatory diagram showing a state in which a part of the obstacle lies within the speed reduction area as a result of further advancement of the lower travelling body from the position shown in FIG. 9A.

FIG. 9A is an explanatory diagram showing a state in which the obstacle 50 exists outside the speed reduction area 14A when the lower travelling body 12 advances with the upper slewing body 14 slewed leftward (counterclockwise) through 90 degrees from a reference position (position at which the front-rear direction of the upper slewing body 14 coincides with a front-rear direction of the lower travelling body 12). FIG. 9B is an explanatory diagram showing a state in which a part of the obstacle 50 lies within the speed reduction area 14A as a result of further advancement of the lower travelling body 12 from the position shown in FIG. 9A.

When the upper slewing body 14 moves from the position shown in FIG. 9A to the position shown in FIG. 9B, the distance from the obstacle sensor 48R disposed on the right surface 14SR of the upper slewing body 14 to the obstacle 50 decreases, due to the forward movement of the lower travelling body 12. In this case, the necessary movement of the upper slewing body 14 to prevent the right surface 14SR from coming into contact with the obstacle 50 is to restrain the lower travelling body 12 from advancing. In other words, although it is difficult to appropriately select a movement of the upper slewing body 14 to avoid a contact with the obstacle 50 if only based on the position of the obstacle 50 relative to the virtual boundary surface 142, it is possible to appropriately select a movement of the upper slewing body 14 to avoid a contact with the obstacle 50 if the movement of the upper slewing body 14 to be controlled is specified considering the slewing state of the upper slewing body 14 with respect to the lower travelling body 12 and the travelling state of the lower travelling body 12.

In the hydraulic excavator 10, when at least a part of an obstacle lies within the speed reduction area 14A, the movement speed of the upper stewing body 14 is reduced. This makes it possible to more reliably prevent the upper stewing body 14 from coming into contact with the obstacle.

In the hydraulic excavator 10, the movement speed of the upper slewing body 14 is further reduced as an obstacle approaches the virtual boundary surface 142. This makes it possible to more reliably prevent the upper slewing body 14 from coming into contact with the obstacle.

In the hydraulic excavator 10, when at least a part of an obstacle lies within the stop area 14B, the movement of the upper slewing body 14 is stopped. This makes it possible to more reliably prevent the upper slewing body 14 from coming into contact with the obstacle.

In the hydraulic excavator 10, an obstacle closest to the virtual boundary surface 142 is selected. This allows the upper slewing body 14 to more accurately perform a movement to avoid a contact with the obstacle.

In the hydraulic excavator 10, the plurality of obstacle sensors 48R, 48L and 48B are disposed. This makes it possible to more accurately recognize obstacles existing around the upper slewing body 14.

Application Example of Embodiment 1

Figure 10:
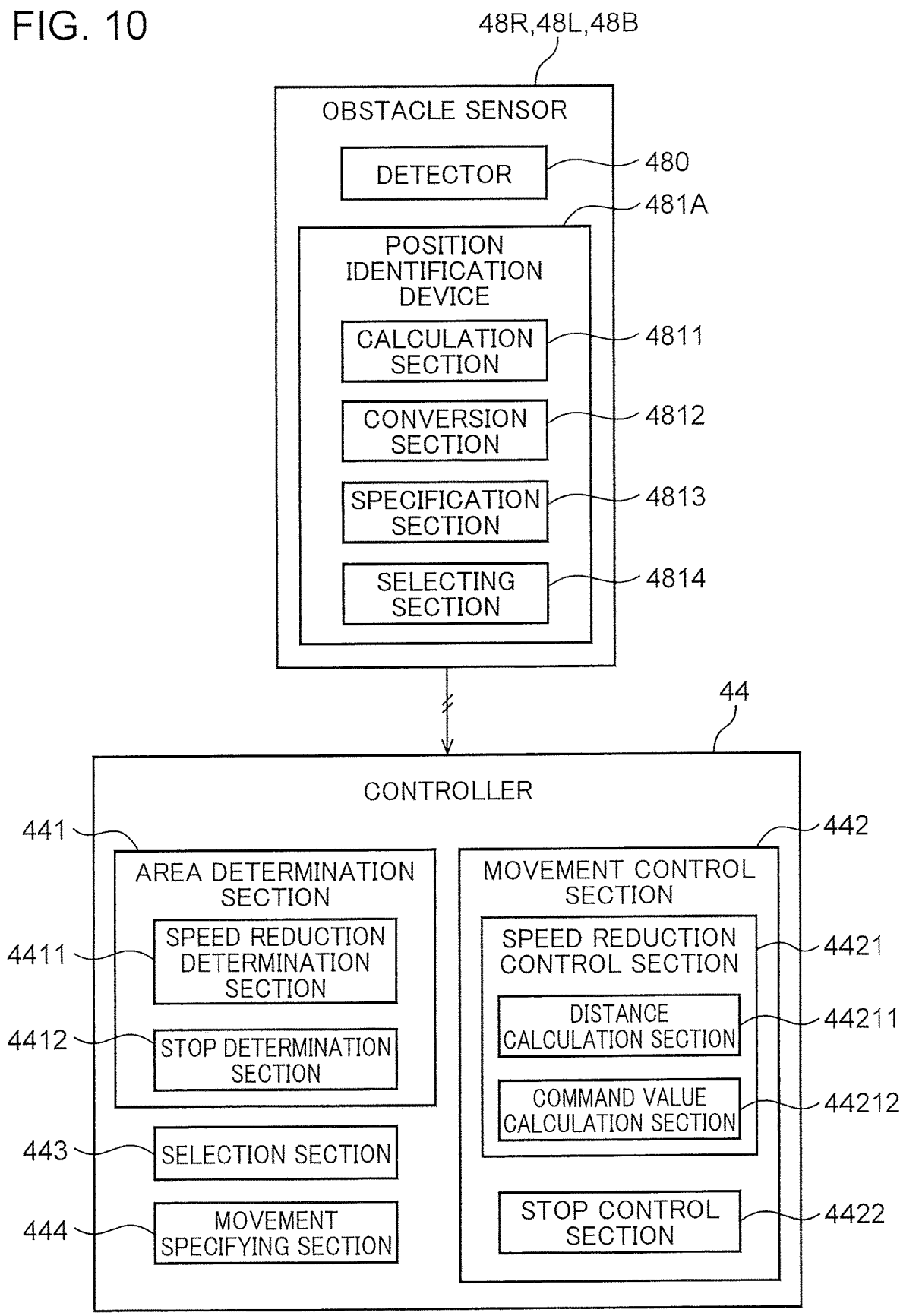
FIG. 10 is a block diagram showing an obstacle sensor and a controller according to a modified embodiment of the present invention.
Figure 11:
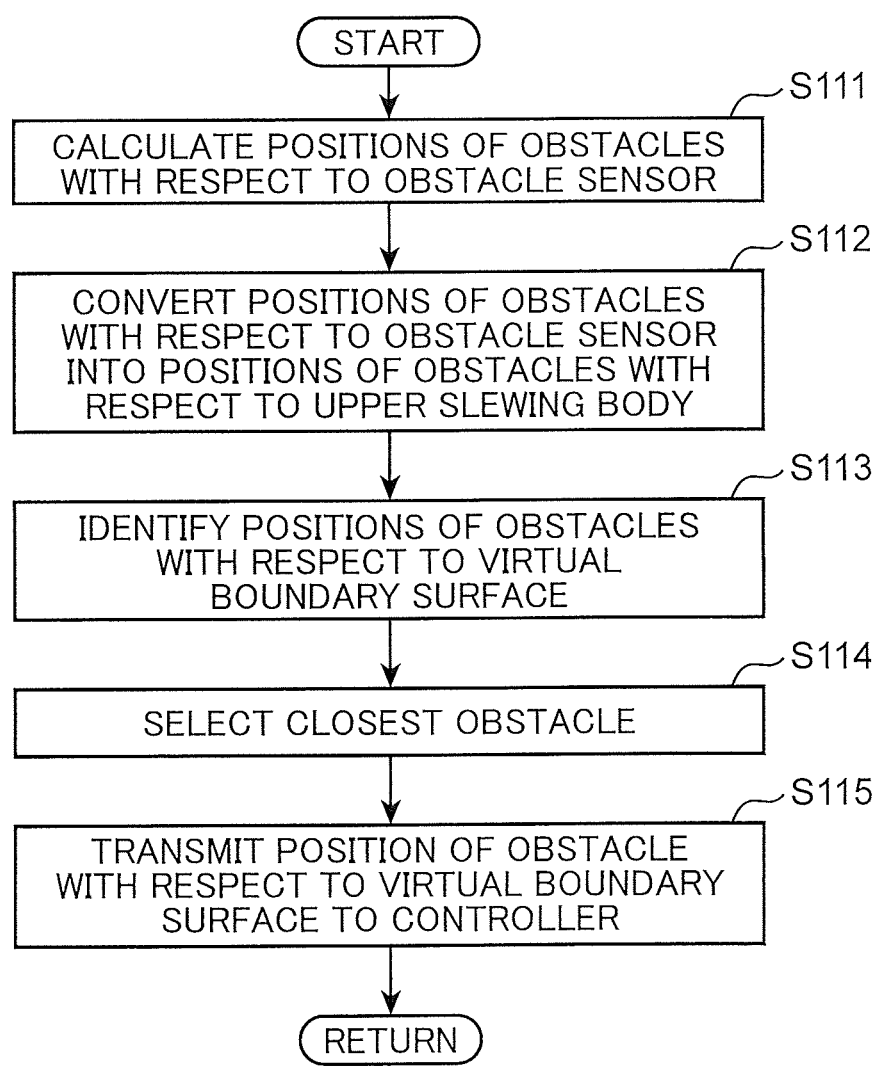
FIG. 11 is a flowchart showing a position identification control performed by a position identification device in the modified embodiment of the present invention.

An application example of the above-described embodiment will be described with reference to FIGS. 10 and 11 which shows a case where each of three obstacle sensors 48R, 48L, and 48B can detect a plurality of obstacles. FIG. 10 is a block diagram showing the obstacle sensor 48R (48L, 48B) and a controller 44 according to the modified embodiment. FIG. 11 is a flowchart showing a position identification control performed by a position identification device 481A in the modified embodiment.

With reference to FIG. 10, each of the obstacle sensors 48R, 48L and 48B includes the position identification device 481A instead of the position identification device 481. The position identification device 481A is different from the position identification device 481 in that it further includes a selecting section 4814. The selecting section 4814 selects, when a detector 480 detects a plurality of obstacles, an obstacle closest from the obstacle sensor that is provided with the detector 480 detecting the plurality of obstacles. When the detector 480 detects only a single obstacle, the obstacle is selected as the obstacle closest from the obstacle sensor.

Now, the position identification control performed by the position identification device 481A will be described with reference to FIG. 11.

Hereinafter, a case where the position identification device 481A uses detection results obtained by the obstacle sensor 48R will be described. Cases of using detection results obtained by the obstacle sensor 48L or 48B are similar to the case of using the detection result obtained by the obstacle sensor 48R, and therefore, descriptions thereof will be omitted.

At step S111, the position identification device 481A uses detection results obtained by the obstacle sensor 48R to calculate the respective positions of detected obstacles relative to the obstacle sensor 48R. Thereafter, at step S112, the position identification device 481A converts the position of each obstacle relative to the obstacle sensor 48R calculated by a calculation section 4811 into a position of the obstacle relative to the upper slewing body 14. Thereafter, at step S113, the position identification device 481A uses conversion results obtained by a conversion section 4812 to identify the respective positions of the obstacles relative to a virtual boundary surface 142. Thereafter, at step S114, the position identification device 481A selects an obstacle closest from the obstacle sensor 48R. Thereafter, at step S115, the position identification device 481A transmits to the controller 44 the position of the obstacle selected at step S114 (position of the obstacle relative to the virtual boundary surface 142).

The application example of embodiment can also provide the similar advantageous effects to those provided by the above-described embodiment.

Application Example of Embodiment 2

Figure 12:
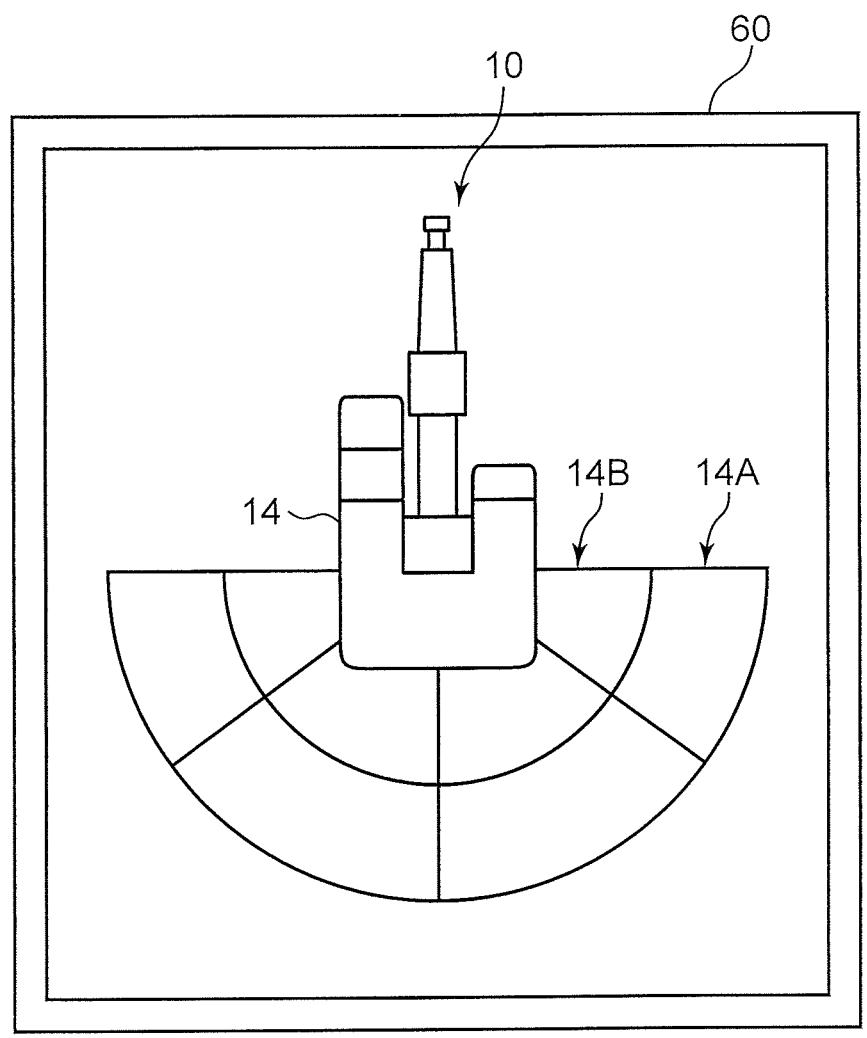
FIG. 12 is an explanatory diagram of a display screen of a display device disposed in a cab of the hydraulic excavator, the display screen showing an example of a mode for displaying the position of an obstacle with respect to the upper slewing body.

In the above-described embodiment, it is possible to configure the hydraulic excavator 10 such that the position of an obstacle relative to the upper slewing body 14 is displayed on a display device 60 disposed in the cab 143 as shown in FIG. 12.

Here, in the example shown in FIG. 12, a region in which an obstacle exists in the speed reduction area 14A and the stop area 14B set around the upper slewing body 14, is displayed in a mode different from that of the other region, to indicate the position of the obstacle relative to the upper slewing body 14. This allows the operator of the hydraulic excavator 10 to easily recognize the position of the obstacle.

In addition, in the example shown in FIG. 12, each of the speed reduction area 14A and the stop area 14B includes a plurality of divided regions. This allows the operator of the hydraulic excavator 10 to more easily recognize the position of the obstacle.

The embodiment of the present invention has been described in detail, which is, however, only an example. The present invention is not limited by the above-described embodiment.

In the above-described embodiment, an electromagnetic inverse proportional valve is used as the first limiting valve 41 and the second limiting valve 42, but an electromagnetic proportional valve may be used instead of the electromagnetic inverse proportional valve.

In the above-described embodiment, an operation device may be used that outputs an electrical signal corresponding to an operation amount specified by the operator of the working machine to allow the controller 44 to control the operations of the first limiting valve 41 and the second limiting valve 42 in accordance with the electrical signal output by the operation device.

In the above-described application example of the embodiment 2, only the image showing the position of the obstacle relative to the upper slewing body 14 is displayed on the display device 60, but an image showing another piece of information may be displayed together.

In the present invention, the working machine is not limited to a particular type as long as it includes the lower travelling body and the upper slewing body. The working machine is, for example, of a hydraulic type. An example of the hydraulic working machine is a hydraulic excavator.

The working machine according to the present invention may be operated in either an attended or an unattended fashion.

In the present invention, the movement of the upper slewing body includes (1) a movement caused by travelling of the lower travelling body, (2) a movement caused by slewing of the upper slewing body with respect to the lower travelling body, and (3) a movement caused by both (1) and (2).

In the present invention, the obstacle detected by the detection device is not particularly limited as long as it obstructs the safe movement of the working machine. The obstacle may be, for example, another working machine, a person, or any structure.

In the present invention, the detection device is not particularly limited as long as it can obtain information necessary to identify the position of an obstacle. The position of the obstacle may be identified in a two-dimensional coordinate system or in a three-dimensional coordinate system. The information necessary to identify the position of the obstacle includes, for example, (1) the distance from the detection device to the obstacle and (2) the direction in which the obstacle lies with respect to the detection device. Such pieces of information relating to (1) and (2) may be actually measured by the detection device, or derived from data actually measured by the detection device. The detection device is, for example, in the form of a stereo camera.

In the present invention, the method of calculating the position of an obstacle relative to the detection device is not particularly limited. The position of the obstacle relative to the detection device may be identified in a two-dimensional coordinate system or in a three-dimensional coordinate system. The position of the obstacle relative to the detection device may be identified in a two-dimensional coordinate system with the located position of the detection device as the origin, for example.

In the present invention, a single or a plurality of obstacles may be detected by one detection device at once.

In the present invention, the position where the detection device is located is not particularly limited as long as it allows the detection device to detect an obstacle existing around the upper slewing body. The detection device may be disposed on a side surface or an upper surface of the upper slewing body, for example.

In the present invention, a single or a plurality of detection devices may be provided.

In the present invention, the position identification device may be provided in the detection device or in the movement control device, or provided separately from the detection device and the movement control device.

In the present invention, the position identification device is realized, for example, by the central processing unit reading a program stored in the storage device and performing predetermined processing. At least part of the position identification device may be realized by an integrated circuit such as ASIC.

In the present invention, the movement control device is realized, for example, by the central processing unit reading a program stored in the storage device and performing predetermined processing. At least part of the movement control device may be realized by an integrated circuit such as ASIC.

In the present invention, the method of converting the position of an obstacle relative to the detection device to the position of the obstacle relative to the upper slewing body is not particularly limited. The position of the obstacle relative to the upper slewing body may be identified in a two-dimensional coordinate system or in a three-dimensional coordinate system. The position of the obstacle relative to the upper slewing body may be identified in the two-dimensional coordinate system with the slewing center of the upper slewing body as the origin, for example.

In the present invention, the movement of the upper slewing body to avoid a contact with an obstacle is realized by controlling the movement of the upper slewing body when the upper slewing body moves toward the obstacle or when the obstacle moves toward the upper stewing body. The movement of the upper slewing body to avoid a contact with the obstacle is set considering the current movements of the upper slewing body and the lower travelling body, for example.

In the present invention, the virtual boundary surface is not particularly limited as long as it is set outside the side surface of the upper slewing body in the plan view. The virtual boundary surface may be set so as to surround or not to surround the upper slewing body in the plan view, for example. The virtual boundary surface may be set so as to extend in parallel to at least a part of the side surface of the upper slewing body, or not in the plan view.

In the present invention, the information indicating the positional relationship between the virtual boundary surface and the obstacle includes, for example, a part of the virtual boundary surface that is closest to the obstacle and the shortest distance from the part to the obstacle.

The above-described specific embodiment mainly includes an invention configured as follows.

A working machine according to the present invention comprises: a lower travelling body; an upper slewing body disposed in a slewable manner with respect to the lower travelling body; at least one detection device disposed on the upper slewing body to detect an obstacle existing around the upper slewing body; a position identification device configured to identify a position of the obstacle detected by the at least one detection device relatively to the upper slewing body; and a movement control device configured to control the movement of the upper slewing body in such away as to prevent the upper slewing body from coming into contact with the obstacle, based on the position of the obstacle relative to the upper slewing body, the position being identified by the position identification device, wherein: the position identification device includes a calculation section configured to calculate a position of the obstacle relative to the at least one detection device, by use of a detection result obtained by the at least one detection device, a conversion section configured to convert the position of the obstacle relative to the at least one detection device calculated by the calculation section into a position of the obstacle relative to the upper slewing body, and an identification section configured to identify a position of the obstacle relative to a virtual boundary surface that is set outside a side surface of the upper slewing body in plan view, by use of a conversion result obtained by the conversion section; and the movement control device controls the movement of the upper slewing body in such a way as to prevent the upper slewing body from coming into contact with the obstacle based on the position of the obstacle relative to the virtual boundary surface, the position being identified by the identification section.

In the above-described working machine, the position of the obstacle calculated by use of the detection result obtained by the detection device (position of the obstacle relative to the detection device) is converted into the position of the obstacle relative to the upper slewing body. This makes it possible to recognize the position of the obstacle in a coordinate system based on the upper slewing body. Consequently, it is possible to accurately recognize the positional relationship between the virtual boundary surface set according to the upper slewing body and the obstacle.

Here, the virtual boundary surface is set outside the side surface of the upper slewing body in the plan view. Therefore, when the position of the obstacle is recognized in relation to the virtual boundary surface, it is possible to more reliably prevent the upper slewing body from coming into contact with the obstacle.

In the above-described working machine, it is preferred that the movement control device includes a speed reduction determination section configured to determine whether at least a part of the obstacle lies within a speed reduction area that is set outside the virtual boundary surface in the plan view, and a speed reduction control section configured to reduce a movement speed of the upper slewing body when at least a part of the obstacle lies within the speed reduction area.

The working machine configured in this manner can more reliably prevent the upper slewing body from coming into contact with the obstacle by reducing the movement speed of the upper slewing body when at least a part of the obstacle lies within the speed reduction area.

In the above-described working machine, it is preferred that the speed reduction control section reduces the movement speed of the upper slewing body at a greater rate as the shortest distance from the obstacle to the virtual boundary surface decreases.

In this case, the movement speed of the upper slewing body is further reduced as the obstacle approaches the virtual boundary surface. This makes it possible to more reliably prevent the upper slewing body from coming into contact with the obstacle.

In the above-described working machine, it is preferred that the movement control device includes a stop determination section configured to determine whether at least a part of the obstacle lies within a stop area that is set outside the virtual boundary surface in the plan view, and a stop control section configured to stop the movement of the upper slewing body when at least a part of the obstacle lies within the stop area.

The working machine configured in this manner stops the movement of the upper stewing body when at least a part of the obstacle lies within the stop area. This makes it possible to more reliably prevent the upper slewing body from coming into contact with the obstacle.

In the above-described working machine, it is preferred that the position identification device further includes a selection section configured to select an obstacle closest to the virtual boundary surface from among the plurality of obstacles based on a positional relationship between each of the plurality of obstacles and the virtual boundary surface, when the at least one detection device detects a plurality of obstacles; and the movement control device controls the movement of the upper slewing body in such a way as to prevent the upper stewing body from coming into contact with the obstacle selected as being closest to the virtual boundary surface by the selection section, based on the positional relationship between the selected obstacle and the virtual boundary surface.

In this case, it is possible to recognize the obstacle closest to the virtual boundary surface set outside the side surface of the upper slewing body in the plan view (i.e. the obstacle that is most likely to come into contact with the upper slewing body) among the plurality of obstacles existing around the upper slewing body. This makes it possible to allow the upper slewing body to more accurately perform a movement to avoid a contact with the obstacle.

In the above-described working machine, it is preferred that the at least one detection device includes a plurality of detection devices disposed at respective positions different from each other on the upper sewing body.

In this case, obstacles existing around the upper slewing body are detected by the plurality of detection devices. This makes it possible to more accurately recognize the obstacles existing around the upper slewing body.

In the above-described working machine, it is preferred that the position identification device further includes a selection section configured to select an obstacle closest to the virtual boundary surface from among the plurality of obstacles based on a positional relationship between each of the plurality of obstacles and the virtual boundary surface, when the at least one detection device detects a plurality of obstacles, and that the movement control device controls the movement of the upper slewing body in such a way as to prevent the upper slewing body from coming into contact with the obstacle selected as being closest to the virtual boundary surface by the selection section, based on the positional relationship between the selected obstacle and the virtual boundary surface.

In this case, it is possible to recognize the obstacle closest to the virtual boundary surface set outside the side surface of the upper slewing body in the plan view (i.e. the obstacle that is most likely to come into contact with the upper slewing body) among the plurality of obstacles existing around the upper slewing body. This makes it possible to allow the upper slewing body to more accurately perform a movement to avoid a contact with the obstacle.

This application is based on Japanese Patent application No. 2017-106250 filed in Japan Patent Office on May 30, 2017, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A working machine, comprising:
   a lower travelling body;
   an upper slewing body disposed in a slewable manner with respect to the lower travelling body and including a side surface, the side surface defining an outer edge of the upper slewing body in a plan view and including a front surface, a right surface, a left surface, and a rear surface;
   at least one detector disposed on the upper slewing body to detect an obstacle existing around the upper slewing body;
   a position identifier configured to identify a position of the obstacle detected by the at least one detector relatively to the upper slewing body; and
   a movement controller configured to control the movement of the upper slewing body in such a way as to prevent the upper slewing body from coming into contact with the obstacle, based on the position of the obstacle relative to the upper slewing body, the position being identified by the position identifier, wherein:
   the position identifier includes
      a calculator configured to calculate a position of the obstacle relative to the at least one detector, by use of a detection result obtained by the at least one detector,
      a converter configured to convert the position of the obstacle relative to the at least one detector calculated by the calculator into a position of the obstacle relative to the upper slewing body, and
      an identification sensor configured to identify a position of the obstacle relative to a U-shaped virtual boundary surface that is set outside and apart from a side surface of the upper slewing body in the plan view, by use of a conversion result obtained by the converter, the virtual boundary surface being set along the side surface of the upper slewing body in the plan view and including a right virtual boundary surface located to and apart from the right of the right surface and parallel to the right surface, a left virtual boundary surface located to and apart from the left of the left surface and parallel to the left surface, and a rear virtual boundary surface located behind and apart from the rear surface and along to the rear surface, the virtual boundary surface defining an inner surface of a predetermined U-shaped area; and the movement controller controls the movement of the upper slewing body in such a way as to prevent the upper slewing body from coming into contact with the obstacle in the predetermined U-shaped area based on the position of the obstacle relative to the virtual boundary surface, the position being identified by the identification sensor.

2. The working machine according to claim 1, wherein the movement controller includes
   a speed reduction processor configured to determine whether at least a part of the obstacle lies within a U-shaped speed reduction area, which composes the predetermined U-shaped area, that is set outside the virtual boundary surface in the plan view, and
   a speed reduction controller configured to reduce a movement speed of the upper slewing body when at least a part of the obstacle lies within the speed reduction area.

3. The working machine according to claim 2, wherein the speed reduction controller reduces the movement speed of the upper slewing body at a greater rate as the shortest distance from the obstacle to the virtual boundary surface decreases.

4. The working machine according to claim 1, wherein the movement controller includes
   a stop processor configured to determine whether at least a part of the obstacle lies within a U-shaped stop area, which composes the predetermined U-shaped area, that is set outside the virtual boundary surface in the plan view, and
   a stop controller configured to stop the movement of the upper slewing body when at least a part of the obstacle lies within the stop area.

5. The working machine according to claim 1, wherein:
   the position identifier further includes a selection processor configured to select an obstacle closest to the virtual boundary surface from among the plurality of obstacles based on a positional relationship between each of the plurality of obstacles and the virtual boundary surface, when the at least one detector detects a plurality of obstacles; and the movement controller controls the movement of the upper slewing body in such a way as to prevent the upper slewing body from coming into contact with the obstacle selected as being closest to the virtual boundary surface by the selection processor, based on the positional relationship between the selected obstacle and the virtual boundary surface.

6. The working machine according to claim 1, wherein the at least one detector includes a plurality of detectors disposed at respective positions different from each other on the upper slewing body.

7. The working machine according to claim 6, wherein the position identifier further includes a selection processor configured to select an obstacle closest to the virtual boundary surface from among the plurality of obstacles based on a positional relationship between each of the plurality of obstacles and the virtual boundary surface, when the plurality of detectors detect a plurality of obstacles; and the movement controller controls the movement of the upper slewing body in such a way as to prevent the upper slewing body from coming into contact with the obstacle selected as being closest to the virtual boundary surface by the selection section, based on the positional relationship between the selected obstacle and the virtual boundary surface.

8. The working machine according to claim 1, wherein the movement controller controls the movement of the upper slewing body to avoid contact with the obstacle based on current movements of the upper slewing body and the lower travelling body.

* * * * *